W. B. Leonard,
Gas Meter.
Nº 8,725. Patented Feb. 10, 1852.
Fig. 5.
Fig. 6.
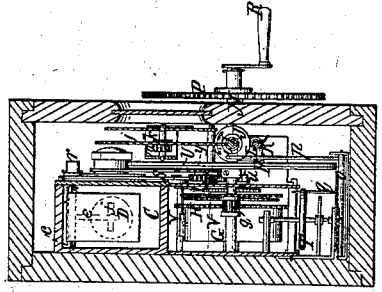
Fig. 2.
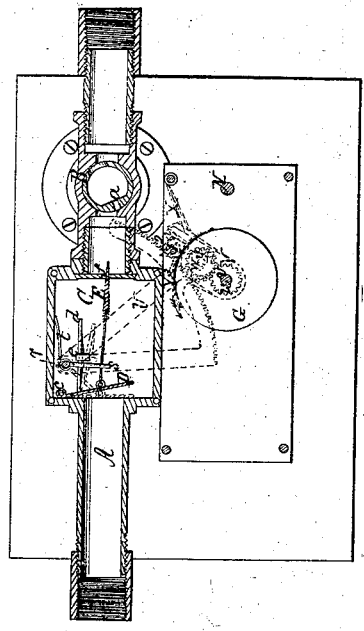
Fig. 4.
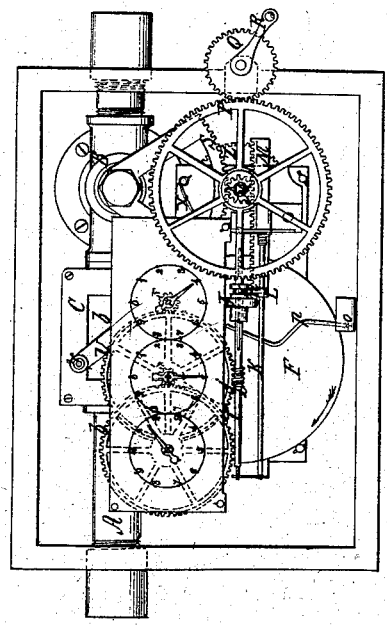
Fig. 1.
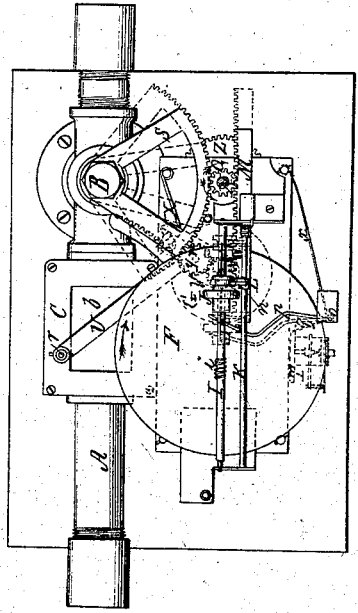
Fig. 3.

UNITED STATES PATENT OFFICE.

WILLIAM B. LEONARD, OF NEW YORK, N. Y.

IMPROVEMENT IN APPARATUS FOR REGULATING AND MEASURING THE FLOW OF GAS.

Specification forming part of Letters Patent No. 8,725, dated February 10, 1852.

*To all whom it may concern:*

Be it known that I, WILLIAM B. LEONARD, of the city, county, and State of New York, have invented a new and Improved Apparatus for Registering the Flow and Consumption of Gases and Fluids; and I do hereby declare that the following is a full, clear, and exact description thereof, reference being had to the accompanying drawings, forming part of this specification, in which—

Figure 1 is a front elevation of the apparatus, having the sliding door removed to show the interior. Fig. 2 is a transverse vertical section of the same, looking from the left-hand side of Fig. 1. Fig. 3 is a front elevation of the working parts of the apparatus, the front and sides of the case, the dials, and the gearing for turning the governing-spindle being removed. Fig. 4 is a longitudinal vertical section taken through the pipe, the cock, and the regulating-chamber. Fig. 5 is a section of the cock, looking from the right hand of Fig. 1. Fig. 6 is a detached view of the catch for keeping open and releasing the valve which closes the pipe on the stoppage of the operation of the meter.

Similar letters of reference indicate corresponding parts in each of the several figures.

My invention consists in the employment of certain mechanism which has a constant motion at a uniform speed communicated to it by suitable means, and which communicates motion to an indicating apparatus at a speed which is governed by the amount of opening in a cock or its equivalent through which the gas or fluid is passing, the media by which the motion is transmitted from the mechanism above named to the indicating apparatus communicating in such a manner with the cock or its equivalent as to make the former travel at the greatest speed when the latter is wide open, and to stop the former when the latter is closed, and the passage through the latter being of such form that the area of its opening will always bear the same relation to the speed of the former.

The amount of gas or fluid of a certain pressure which will pass through the cock or its equivalent in a given time being ascertained by any meter, and provision being made for equalizing the said pressure, if the speed of the first-named mechanism is regulated before starting in proper proportion to the amount of gas passing through the cock when it is wid open, the indicating apparatus will registe the amount passing through for any length c time that it is kept in operation.

The invention is more particularly suited t stores and public buildings where the numbe of burners is stated for the time they are ir use and not changed; but it may be employec in dwelling houses. Its principal advantage is in its not depending upon the pressure ol the gas for its operation, but being drawn by other agency, which insures greater accuracy.

To enable others skilled in the art to make and use my invention, I will proceed to describe its construction and operation.

A is the pipe which supplies the gas or fluid.

B is the cock or faucet through which the gas or fluid passes to the point where it is consumed. It is of the common form, except that the openings $a$ on that side of the plug through which the gas or fluid enters is an oblique or spiral slot, that being, as I consider, the form best suited for making the amount of opening proportionate to the speed of the indicators, for which object its width may be varied, or it may be wider at one end than the other. For gas a number of holes corresponding with the number of burners placed in a similar oblique or spiral line may be used. S is the toothed sector secured to the end of the plug of the cock.

C is the regulating-chamber, through which the gas or fluid passes before going through the cock B. This is more particularly applicable for gas, and may be dispensed with when the meter is used for water. It consists of a box having a movable cover or front, in which there is a glass window, $b$, through which the interior may be examined without removing it.

D is a valve within the chamber, swinging on a pivot or hinge, $c$, and capable of closing the entrance of the pipe A. A rod, $d$, is secured to its back side, on which there is a movable balance-weight, which has a slight tendency to close it, counteracting any tendency of the pressure of the gas to open it too wide. The exit-opening from the chamber C toward the cock consists of a long narrow slit, $f$, in which the point of a wedge, E, of wood or other material, of sufficient width to fit easily, is inserted. This wedge is connected by a small rod with the valve D, and is forced by the pressure of the gas on the said valve to enter the opening $f$ and reduce its area so that the greater the pressure of the gas on the valve D the farther the valve E enters and the smaller the opening becomes.

F, Figs. 1, 2, and 3, is a metal disk having its face covered with a sheet of india rubber or other flexible material. Its spindle or axis is hung in suitable bearings, and carries a pinion, $g$, (see Fig. 2,) which gears into and receives motion from a wheel, H, on the barrel G, within which is the mainspring of the clock-movement.

I is a spindle hung in suitable bearings in front of the disk F, parallel with its face. It carries the small wheel J, which fits to it by a feather and feather-way, so as to be capable of sliding on it, but turning with it. The edge of this wheel is in contact with the face of the disk F. The spindle I carries also an endless screw, $i$, gearing into the teeth of a wheel, $j$, (see Figs. 1 and 2,) which gears with a small pinion, $k$, one-tenth its size, on another spindle, while a pinion, $m$, on its own axis gears into a wheel, $l$, ten times its size, on another spindle, the three spindles carrying indicators or pointers placed outside a dial-plate, on which are three dials divided into tenths—one dial marking tens, another hundreds, and another thousands of feet; or the dials and gearing of the indicators may be divided in any other numerical proportion, using any measurement of capacity as the unit.

K is a stationary bar situated below the spindle I and parallel with it. Upon this bar there is a sliding socket, L, carrying a finger, $n$, which fits in a groove in the boss of the small wheel J. Attached to the socket is the toothed rack-bar M, sliding in suitable guides.

N is the governing-spindle, which is independent of the clock-movement. It carries a pinion, O, gearing into the rack-bar M, and another pinion, about the same size, immediately behind it, gearing into the sector S. One pinion may be made to serve for both. It also carries a toothed wheel, P, which stands outside the case. This gears into a pinion, Q, on another spindle, outside of the case, furnished with a crank-handle, R, and serving to open and close the cock.

$o$, Figs. 1, 2, 3, is a spindle, hung below the clock-movement and carrying a lever, $p$, outside the disk, and a smaller lever, $q$, behind it. This is for stopping the clock-movement when the cock B is shut, which is effected by the wheel J, when it is moved to the center of the disk, coming in contact with the lever $p$ and forcing it forward, so as to bring the smaller lever, $q$, to bear on the balance-wheel T and stop the escapement. This may be understood by reference to Fig. 3, where the levers are shown in blue lines. The lever is held back, when the wheel J is not in contact with it, by a spring, $x$, Fig. 3.

U (seen in Figs. 2 and 3, partly in Fig. 1, and shown by dotted lines in front of the section, Fig. 4) is a toothed sector-lever hung on a spindle, $r$, passing through the regulating-chamber C. This spindle carries a small arm, $s$, within the chamber, and has a spring, $t$, coiled round it, the end of which bears against the top of the chamber and always has a tendency to turn the spindle so as to bring the lever U and arm $s$ to the position shown in red lines in Fig. 4, and close the valve when the lever is not held back.

$u$ (shown in Fig. 2 and also in dotted lines in Fig. 3) is a toothed pinion fast upon the dead-spindle $v$, upon which the barrel G is hung. Upon this spindle is hung a lever, V, on which there is a stud, $w$, carrying a loose pinion, $y$, gearing into $u$ and also into the teeth of the sector on the lever U, against which it is held by a spring, X, at the back of the lever.

1 is a spindle carrying a catch, (seen in Fig. 6,) whose tooth 2 takes into a space between two teeth of the sector on the lever U. The lever V bears on the back of this catch and keeps it in the sector, causing it, in conjunction with the pinion $y$, to hold back the sector-lever. On the spindle 1 there is a small stud, 3, standing out from that part of its periphery above the barrel G, and being turned downward toward the barrel.

Y is a spring secured at one end to the outer periphery of the barrel, and at the other end to the mainspring within the barrel. When the mainspring is wound up, the spring Y lies close to the barrel; but when the mainspring is run down the end of the spring Y, which is attached to it, comes out to the position shown in red lines in Fig. 4, and as by the movement of the barrel it comes in contact with the pin 3 and throws it up, it turns the spindle 1 and throws back the catch 2 against the lever V, which overcomes the resistance of the spring X and removes the pinion $y$ from the teeth of the sector-lever U, whose spindle $r$ is immediately acted upon by the spring $t$, and the lever descends, the arm $s$ coming in contact with the back of the valve $d$ and closing it.

The mode of setting the meter in operation and its *modus operandi* are as follows: The clock-movement is wound up by turning the governing-spindle N in the direction of the blue arrow shown in Fig. 3, the wheel Z on the said spindle gearing into another wheel attached to the mainspring, this wheel Z, as well as the pinion or pinions O, being only confined to the spindle by spring friction-clutches, which prevents the overwinding of any of the parts. It is intended that the mainspring shall be sufficiently wound up to keep the clock going for the usual time required by turning the spindle in shutting off the gas, so that the clock will always be wound up, ready for use before opening the cock. The friction-clutches will, however, admit of the stopping of either the pinion O or wheel Z during the turning of the spindle N, should the winding up not be finished before the shutting off is complete, or should it be finished before the cock is completely shut.

In describing the *modus operandi* I will first suppose the cock shut, when the sector S would be turned a little beyond the position shown by the blue lines in Fig. 3, and the wheel J will be opposite or near the center of the disk F, where there is no motion. I will then suppose that it is desired to open the cock its full width. The valve D must first be released (if shut) by drawing back the sector-lever U. The spindle N must be turned in the direction of the red arrow in Fig. 3, when the sector S and the wheel J will be brought to the position shown by red lines, the wheel being near the periphery or edge of the disk, and receiving a rapid motion, which is transmitted by the endless screw $i$ on its shaft to the gearing of the indicators. To lessen the supply, the spindle must be turned in the direction of the blue arrow, when the sector moves to the right hand and the rack M to the left, reducing the area of the opening in the cock and bringing the wheel J nearer the center of the disk, where it will receive a slower motion, the mainspring being wound in the meantime. The positions in which the cock and wheel are shown in black lines in Figs. 1 and 3 and the cock in Fig. 4 represent the cock about half open, the opening $a$ in its plug being shown in that position by red lines in Fig. 5, and the opening in the barrel of the cock being represented by dotted lines in the same figure. To shut it off, the spindle must be turned still farther in the last-named direction, and when the wheel reaches about the position shown in blue lines it will act upon the lever $p$ and stop the balance wheel, which stops the whole movement.

Having fully described my invention, I will proceed to state what I claim as new and desire to secure by Letters Patent.

I do not claim the indicating apparatus for showing the quantity of gas or fluid consumed in a given time, nor do I confine myself to the use of any particular mode of indicating it, as it may be performed in various ways. Neither do I confine myself to the peculiar form of clock movement or mechanism for giving motion to the disk F; but What I do claim is—

1. The employment, for the purpose of registering the flow of gases and fluids through an aperture, of a disk, F, receiving a constant rotary motion at a uniform speed and giving motion to a wheel, J, in connection with the indicating apparatus, and the cock B or its equivalent, in the manner herein described, to wit: the wheel J being moved farther from or nearer to the center of the disk as the cock is opened or closed, so as to govern the speed of the wheel, and consequently of the indicators, according to the area of the passage through which the gases or fluids are passing.

2. The manner of stopping the clock-movement when the cock or faucet is shut by the arm $q$ on the spindle $o$ being operated by the wheel J and the lever $p$, substantially as herein shown.

3. The manner of closing the valve D and shutting off the gas or fluid when the clock is run down by an arm, $s$, on a spindle, $r$, operated by a spring, $t$, and held back by a lever, U, stopped by suitable catches, and released by the unwinding of the mainspring, substantially in the manner herein specified.

W. B. LEONARD.

Witnesses:
  H. O. LEONARD,
  HENRY C. WRIGHT.